March 12, 1968     E. D. MANNHERZ     3,372,589
SIDE-SADDLE MAGNETIC FLOWMETER
Filed June 14, 1965
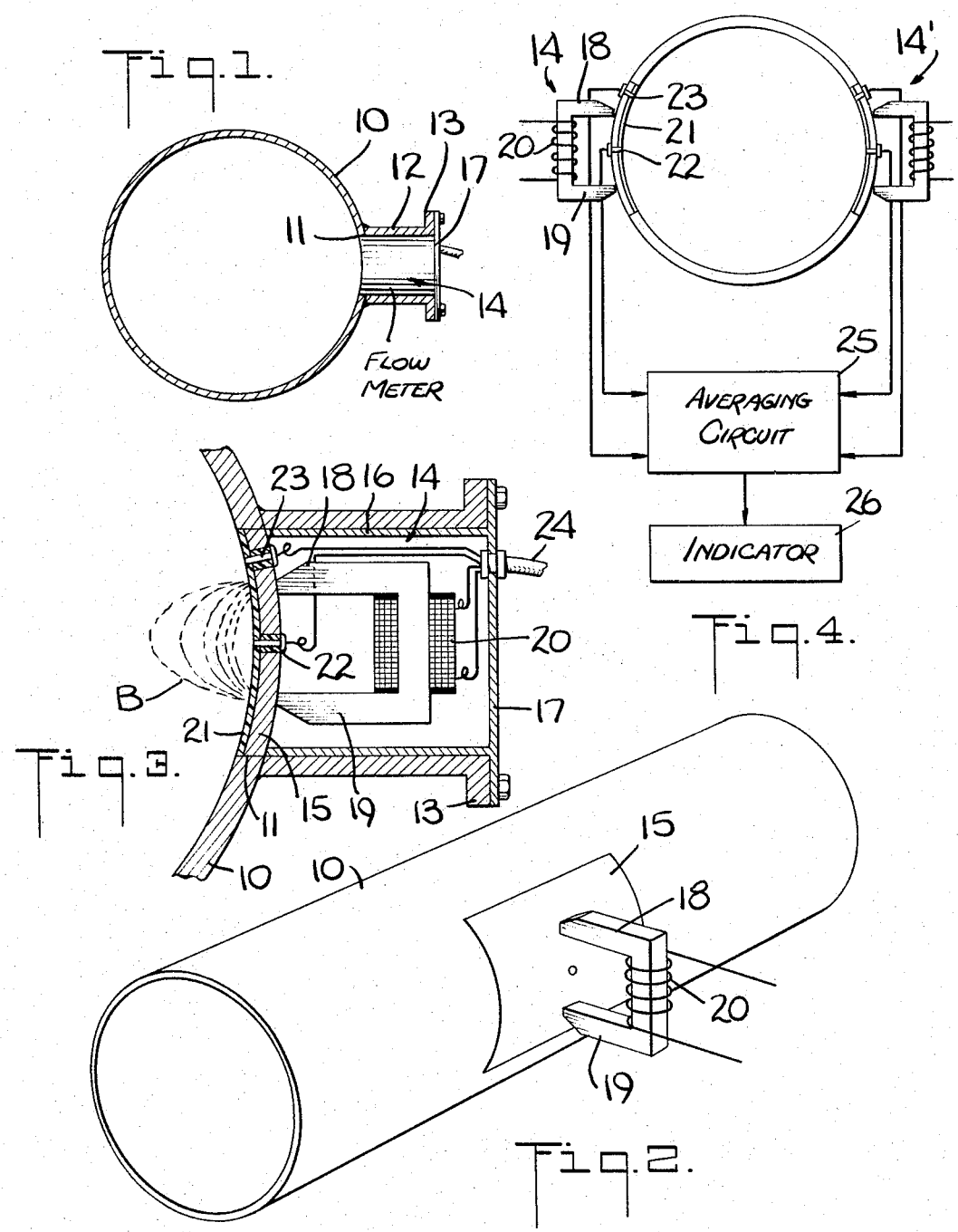

United States Patent Office 3,372,589
Patented Mar. 12, 1968

3,372,589
SIDE-SADDLE MAGNETIC FLOWMETER
Elmer D. Mannherz, Southampton, Pa., assignor to Fischer & Porter Co., Warminster, Pa., a corporation of Pennsylvania
Filed June 14, 1965, Ser. No. 463,641
9 Claims. (Cl. 73—194)

ABSTRACT OF THE DISCLOSURE

A magnetic flowmeter for measuring the rate of flow of a fluid passing through a pipe having a relatively large cross-sectional area, a magnetic field being created within the pipe in a region which represents only a portion of the total cross-sectional area thereof, the voltage induced in said region by the fluid passing therethrough being detected to produce a signal which is then multiplied by a factor depending on the dimensional relationship of the region to the total cross-sectional area of the pipe to provide an accurate reading of the flow rate through the pipe.

---

This invention relates generally to magnetic flowmeters, and more particularly to a flowmeter arrangement in which a magnetic field is established across only a portion of the cross-sectional area of the conduit through which the fluid flows.

The magnetic flowmeter is adapted to measure volume rates of fluids which present difficult handling problems, such as corrosive acids, slurries, detergents, and the like. Because it is a completely obstructionless metering instrument, it can be used to meter fluids without regard to heterogeneous consistency. Factors such as fluid viscosity and density require no compensation and have no perceptible effect on the measurement accuracy.

In the conventional magnetic flowmeter, a uniformly distributed magnetic field is generated which is mutually perpendicular to the longitudinal axis of the meter pipe through which the fluid flows and to the axis of the meter electrodes, this field encompassing the entire cross-sectional area of the pipe.

In measuring relatively small volumetric rates wherein fluids flow through pipes having a relatively small diameter, the construction of the flowmeter represents no serious difficulties, for it is feasible in this situation to mount two saddle-shaped coils on opposing sides of the pipe, and to wrap a laminated core about the pipe to produce the desired magnetic field. However, with very large pipe diameters, the electromagnetic requirements are much more difficult to satisfy and the resultant flowmeter structure is necessarily very massive and cumbersome.

In the conventional flowmeter, the magnetic field developed across the pipe is uniform, and the voltage induced in the fluid is proportional to the average velocity of this fluid. Changes in velocity profile due to viscosity or turbulence variations do not affect the generated voltage, and any change in average velocity must result in a proportional change in the induced voltage. However, this is only valid when axi-symmetrical variations occur in the velocity profile. It is not true when asymmetrical variations arise in the velocity profile by reason of upstream disturbances, or in the case of liquid metals, from the action of magnetic forces. Hence, in a conventional flowmeter, the response is not reliable when the velocity profile is asymmetrical.

Accordingly, it is the main object of this invention to provide a magnetic flowmeter for flow pipes having relatively large dimensions, the flowmeter producing a magnetic field across only a portion of the pipe in a plane perpendicular to the axis of the pipe. Though the output of the meter is only a function of the fluid flow in that region of the pipe in which the magnetic field is established, the total flow rate in the pipe can be computed by multiplying the velocity value obtained by a factor which depends on the total cross-sectional area of the pipe.

Also an object of this invention is to provide a magnetic flowmeter system constituted by two or more flowmeters of the above-described type disposed about the periphery of the pipe to produce separate signals which can be averaged to measure the average velocity existing in the several regions in which a magnetic field is established. This system is advantageous in conjunction with pipes in which a non-uniform or asymmetrical velocity distribution exists.

More specifically, it is an object of the invention to provide a side-saddle magnetic flowmeter in which a single magnet is installed on the outside of a magnetically-permeable section of the pipe wall, one electrode being mounted within the resultant magnetic field, and the other outside of this field, whereby fluid passing through that region within the pipe containing the magnetic field has a voltage induced therein which is detected by the electrodes to afford a flowrate reading.

A significant feature of the invention is that the entire measuring element constituted by the pipe section, the electromagnet mounted thereon for producing the electromagnetic field, and the two electrodes, can be made into a unitary assembly which can be installed within a window cut into the pipe to accommodate the pipe section, whereby the pipe is free of obstruction.

For a better understanding of the invention as well as other objects and further features thereof, reference is made to the following detailed description to be read in conjunction with the accompanying drawing, wherein:

FIG. 1 is a transverse view of a pipe having a side-saddle magnetic flowmeter mounted therein in accordance with the invention;

FIG. 2 is a perspective view showing only the pipe section and the electromagnet component of the flowmeter;

FIG. 3 is a sectional view of the side-saddle magnetic flowmeter; and

FIG. 4 shows schematically a multiple arrangement of side-saddle magnetic flowmeters.

Referring now to the drawings, and more particularly to FIGS. 1 and 2, there is shown a pipe 10 of relatively large diameter and of circular cross-section, through which flows a fluid to be metered. It is to be understood that the pipe may be in any other configuration, and may be formed of any suitable conduit material, which may be electrically conductive or non-conductive.

Cut into one side of the pipe is a window 11, and projecting outwardly therefrom is a saddle 12, one end of which is welded to the border of the window, the other end of which has a flange 13 formed therein. The saddle affords a chamber for receiving a magnetic flowmeter assembly in accordance with the invention, the meter generally being designated by numeral 14.

Flowmeter assembly 14 is constituted by a pipe wall section 15 whose dimensions and curvature match that of the window 11 into which it is snugly received. The wall section is supported at one end of a casing 16 which telescopes within the saddle and is provided with an end plate 17 resting against the saddle flange 13 and is secured thereto by suitable bolts or other means. The arrangement is such that the flowmeter assembly may readily be removed for repair or replacement.

Supported within casing 16 is an electromagnet including polepieces 18 and 19 and a coil 20 which when energized, causes a magnetic field to be created whose lines of flux extend between the polepieces, as shown in FIG. 3. These lines of flux B are not parallel lines, as is the case in conventional flowmeter arrangements wherein coils are provided on diametrically opposed sides of the pipe, but the lines curve to join the two polepieces which are on the same side of the pipe.

Wall section 15 is formed of a suitable non-magnetic material, which may be electrically non-conductive or conductive. A suitable electrically non-conductive material is reinforced fiberglass. If it is formed of electrically conductive, non-magnetic material, it must be lined with a layer of electrical insulation, such as layer 21 in FIG. 3. A suitable material for the section is stainless steel, the inner wall of which is lined with "Teflon" or "Neoprene," or other substance which will prevent short-circuiting of the voltage induced in the fluid passing through the region containing the magnetic field.

Voltage generated by the flow of fluid through the magnetic field created by the electromagnet in the adjacent region of the pipe is detected by two electrodes 22 and 23. One of these electrodes is mounted on the wall section 15 centrally between the polepieces 18 and 19, whereas the other electrode is mounted on the same section 15 to one side of the polepiece 18 at a position outside of the magnetic field. Both electrodes are preferably mounted flush with the interior wall of the section 15, and are gasketed with insulating sleeves of "Teflon" or similar insulating material. The electrodes may be of stainless steel, or for highly corrosive uses, platinum may be used.

Leads from the electrodes and electromagnet coil are connected to a shielded cable 24 extending through plate 17. Suitable sealing is provided to prevent leakage of fluid from the pipe.

In practice, the coil is preferably excited with a commercially available 60-cycle alternating voltage to produce the magnetic field B, whose lines of flux curve between polepieces 18 and 19 in the adjacent pipe region which occupies only a portion of the total cross-sectional area of the pipe. The operation of the device is based on Faraday's law of electromagnetic induction.

As the fluid moves transversely at a velocity V through the magnetic field B, a voltage E is induced across the fluid in the plane of the meter electrodes. This voltage is proportional to the rate of fluid flow through said region. Since the relative size of the region with respect to the total cross-sectional area of the pipe is known, the voltage reading obtained at the electrodes may be multiplied by a proper factor to give the desired flow-rate reading. The scale of the voltage measuring circuit coupled to the electrodes may be calibrated to provide direct readings of flow rate.

As shown in FIG. 4, it is also possible to use two or more identical flowmeter assemblies 14 and 14' spaced about the periphery of the pipe, the pipe having an equal number of windows to accommodate the assemblies. Each flowmeter assembly provides a signal indication of the flow-rate not for the total area of the pipe, but only for the adjacent region. The signals derived from these assemblies can then be averaged on a suitable circuit 25 to measure the average velocity of flow which exists in the various regions in which a measurement is taken.

This average value for the region, each of which represents a like portion of the total cross-sectional area, can then be multiplied by a proper factor to give the desired reading for the entire area in indicator 26. This arrangement is useful in pipes in which a non-uniform or asymmetrical velocity distribution is encountered.

While there has been shown and described a preferred embodiment of magnetic flowmeter in accordance with the invention, it will be appreciated that many changes and modifications may be made therein without, however, departing from the essential spirit of the invention as defined in the annexed claims.

What I claim is:

1. The method of measuring the flow rate of a fluid passing through a pipe having a relatively large cross-sectional area, comprising the steps of:
   (a) creating a magnetic field in at least one lateral region within said pipe, which represents only a predetermined portion of the total cross-sectional area thereof,
   (b) detecting the voltage induced in fluid passing through said region to produce a signal representing the flow rate through said region, and
   (c) multiplying said signal by a factor depending on the dimensional relationship of said region to the total cross-sectional area of said pipe to provide a reading of the flow rate through said pipe.

2. The method as set forth in claim 1, wherein said magnetic field is created in at least two lateral regions within said pipe, and the voltages derived from these regions are averaged to produce a signal which is multiplied to provide said reading.

3. A magnetic flowmeter for measuring the flow of fluid through a pipe having a relatively large cross-sectional area, said meter comprising:
   (a) magnetic means secured externally to a non-magnetic section of said pipe to produce a magnetic field within said pipe in a lateral region which is only a predetermined portion of the total cross-sectional area thereof,
   (b) a first electrode mounted on said pipe within said field,
   (c) a second electrode mounted on said pipe at a position outside of said field to provide with said first electrode a signal representing the flow rate through said region, and
   (d) indicator means for multiplying said signal by a factor depending on the dimensional relationship of said region to the total cross-sectional area of said pipe to provide a reading of the flow rate through said pipe.

4. A flowmeter as set forth in claim 3, wherein said magnetic means includes a magnet having two polepieces secured at spaced positions to said non-magnetic section, and said first electrode is positioned intermediate said polepieces.

5. A magnetic flowmeter arrangement for measuring the flow of fluid through a pipe, which fluid has a velocity profile which is asymmetrical, said flowmeter comprising a plurality of flowmeter assemblies disposed at spaced positions about said pipe, each assembly including magnetic means secured externally to a non-magnetic section of said pipe to produce therein a magnetic field in a lateral region which is only a portion of the total cross-sectional area thereof, and electrode means to detect the voltage induced in the fluid in the related region.

6. A magnetic flowmeter arrangement as set forth in claim 5, further including means to average the voltage derived from each assembly to produce an output signal, and means to indicate the signal to provide a reading of flow rate.

7. A magnetic flowmeter assembly for a pipe having a relatively large cross-sectional area through which fluid is flowable, said pipe having a lateral window therein, said meter comprising:
   (a) a wall section formed of non-magnetic material receivable within said window and having corresponding dimensions,
   (b) an electromagnet having two polepieces secured to said section to produce a magnetic field within the region adjacent said section, said region representing only a predetermined portion of the total cross-sectional area of said pipe, a first electrode mounted in said section between said polepieces,
   (c) a second electrode mounted in said section to one side of one of said polepieces and outside of said field to provide with said first electrode a signal representing the flow rate through said region, and
   (d) indicator means for multiplying said signal by a factor depending on the dimensional relationship of said region to the total cross-sectional area of said pipe to provide a reading of the flow rate through said pipe.

8. A flowmeter assembly as set forth in claim 7, further including a saddle extending laterally from said pipe and secured to the border of said window to accommodate said assembly.

9. A flowmeter assembly as set forth in claim 7, wherein the interior of said section is lined with a layer of insulating material, and said electrodes are flush therewith to avoid obstructing said pipe.

References Cited

UNITED STATES PATENTS

| 3,119,960 | 1/1964 | Kenyon | 73—194 X |
| 3,323,363 | 6/1967 | Ketelsen | 73—194 |

RICHARD C. QUEISSER, *Primary Examiner.*

C. A. RUEHL, *Assistant Examiner.*